(12) United States Patent
Kinder et al.

(10) Patent No.: US 10,300,550 B2
(45) Date of Patent: May 28, 2019

(54) UNIVERSAL CONDUIT LINER FOR A WELDING TORCH

(71) Applicant: Victor Equipment Company, Denton, TX (US)

(72) Inventors: David Allen Kinder, Lewisville, TX (US); Bryan Young, Luling, TX (US); Kyle Stuart, Wichita, KS (US)

(73) Assignee: Victor Equipment Company, Denton, TX (US)

( * ) Notice: Subject to any disclaimer, the term of this patent is extended or adjusted under 35 U.S.C. 154(b) by 636 days.

(21) Appl. No.: 13/746,801

(22) Filed: Jan. 22, 2013

(65) Prior Publication Data
US 2013/0240496 A1 Sep. 19, 2013

Related U.S. Application Data

(60) Provisional application No. 61/588,592, filed on Jan. 19, 2012.

(51) Int. Cl.
*B23K 9/24* (2006.01)
*B23K 9/32* (2006.01)

(52) U.S. Cl.
CPC ............ *B23K 9/24* (2013.01); *B23K 9/323* (2013.01)

(58) Field of Classification Search
CPC .......... B23K 9/24; B23K 10/00; B23K 9/323; H05H 2001/3478; H05H 1/34
USPC ........................................................ 219/138
See application file for complete search history.

(56) References Cited

U.S. PATENT DOCUMENTS

| | | | | |
|---|---|---|---|---|
| 2,727,970 A | * | 12/1955 | Turbett | 219/137.62 |
| 3,248,515 A | * | 4/1966 | Gorman et al. | 219/137.9 |
| 3,249,734 A | * | 5/1966 | Meyer | 219/137.61 |
| 3,261,962 A | * | 7/1966 | Carkhuff et al. | 219/137.42 |
| 3,272,961 A | * | 9/1966 | Maier, Jr. et al. | 219/60 A |
| 3,281,571 A | * | 10/1966 | Gilmore | 219/137.9 |
| 3,283,833 A | * | 11/1966 | Bodine, Jr. | 175/56 |
| 3,444,352 A | * | 5/1969 | Ogden et al. | 219/73.2 |
| 3,783,233 A | * | 1/1974 | dal Molin | 219/137.61 |
| 3,891,249 A | * | 6/1975 | Moore | 285/189 |
| 3,980,860 A | * | 9/1976 | Howell et al. | 219/137.41 |
| 3,999,033 A | * | 12/1976 | Willgohs et al. | 219/137.51 |

(Continued)

FOREIGN PATENT DOCUMENTS

| | | |
|---|---|---|
| DE | 198 13 419 A1 | 11/1998 |
| DE | 202010007364 U1 | 8/2010 |
| WO | WO 2010/135752 A2 | 12/2010 |

OTHER PUBLICATIONS

PCT Serial No. PCT/US2013/022509—International Search Report and the Written Opinion of the International Searching Authority, dated Apr. 26, 2013.

(Continued)

*Primary Examiner* — Eric S Stapleton
(74) *Attorney, Agent, or Firm* — Edell, Shapiro & Finnan, LLC

(57) ABSTRACT

A universal conduit assembly for a welding torch is provided that includes a conduit liner defining a proximal end portion and a distal end portion, a conduit tip secured to the proximal end portion of the conduit liner, and an interchangeable conduit stop removably secured to the conduit tip. The interchangeable conduit stop is adapted for connection to a specific OEM (Original Equipment Manufacturer) power connector.

24 Claims, 5 Drawing Sheets

(56) References Cited

U.S. PATENT DOCUMENTS

| | | | |
|---|---|---|---|
| 4,105,891 A * | 8/1978 | Hill et al. | 219/137.43 |
| 4,158,763 A * | 6/1979 | Moerke | 219/137.42 |
| 4,206,862 A * | 6/1980 | DaCosta | 226/178 |
| 4,282,419 A * | 8/1981 | Auer | 219/137.44 |
| 4,284,873 A * | 8/1981 | Schluter | 219/136 |
| 4,393,298 A * | 7/1983 | Frantzreb, Sr. | 219/137.62 |
| 4,582,979 A * | 4/1986 | Moerke | 219/137.63 |
| 4,600,824 A * | 7/1986 | Moerke | 219/137.63 |
| 4,624,410 A * | 11/1986 | Rogers | 239/83 |
| 4,687,899 A * | 8/1987 | Acheson | 219/76.14 |
| 4,873,419 A * | 10/1989 | Acheson | 219/125.1 |
| 4,879,446 A * | 11/1989 | Morgan et al. | 219/75 |
| 4,892,990 A * | 1/1990 | Acheson | 219/76.14 |
| 4,952,769 A * | 8/1990 | Acheson | 219/76.14 |
| 5,384,447 A * | 1/1995 | Raloff et al. | 219/137.31 |
| 5,521,355 A * | 5/1996 | Lorentzen | 219/137.7 |
| 5,558,268 A * | 9/1996 | Acheson | 228/29 |
| 5,595,671 A * | 1/1997 | David | 219/137.62 |
| 5,728,995 A * | 3/1998 | Kensrue | 219/137.31 |
| 5,782,987 A * | 7/1998 | Furman | 134/15 |
| 6,054,675 A * | 4/2000 | Kurokawa et al. | 219/146.1 |
| 6,062,386 A * | 5/2000 | Inoue et al. | 206/397 |
| 6,066,823 A * | 5/2000 | Lageose | 219/60.2 |
| 6,079,243 A * | 6/2000 | Inoue et al. | 72/41 |
| 6,137,076 A * | 10/2000 | Esslinger et al. | 219/76.14 |
| RE36,997 E * | 12/2000 | Kensrue | 219/137.31 |
| 6,284,995 B1 * | 9/2001 | Esslinger et al. | 219/76.14 |
| 6,337,144 B1 * | 1/2002 | Shimizu et al. | 428/624 |
| 6,486,438 B1 * | 11/2002 | Esslinger | 219/125.11 |
| 6,649,858 B2 * | 11/2003 | Wakeman | 219/73.2 |
| 6,747,248 B2 * | 6/2004 | Hoffmann | 219/137.43 |
| 6,786,752 B1 * | 9/2004 | Kerekes et al. | 439/339 |
| 7,274,001 B1 * | 9/2007 | Cusick, III | 219/137.62 |
| 7,309,844 B2 * | 12/2007 | Lajoie | 219/137.31 |
| 7,381,923 B2 * | 6/2008 | Gordon et al. | 219/137.61 |
| 8,106,327 B2 * | 1/2012 | Scaini et al. | 219/74 |
| 8,389,899 B2 * | 3/2013 | Natta | 219/136 |
| 8,552,341 B2 * | 10/2013 | Zamuner | 219/137.31 |
| 8,686,317 B2 * | 4/2014 | Centner | 219/137.62 |
| 8,907,249 B2 * | 12/2014 | Berger et al. | 219/137.31 |
| 2002/0005397 A1 * | 1/2002 | Bong et al. | 219/125.1 |
| 2002/0158048 A1 * | 10/2002 | Stricklen | 219/75 |
| 2003/0015511 A1 * | 1/2003 | Kim et al. | 219/145.1 |
| 2003/0085211 A1 * | 5/2003 | Ito et al. | 219/146.1 |
| 2005/0044687 A1 * | 3/2005 | Matsuguchi et al. | 29/455.1 |
| 2005/0045699 A1 * | 3/2005 | Konishi et al. | 228/214 |
| 2005/0072764 A1 * | 4/2005 | Lajoie | 219/76.14 |
| 2005/0133486 A1 * | 6/2005 | Baker et al. | 219/121.63 |
| 2005/0150883 A1 * | 7/2005 | Tomiyasu et al. | 219/137.9 |
| 2005/0189333 A1 * | 9/2005 | Nakagiri et al. | 219/125.1 |
| 2005/0211686 A1 * | 9/2005 | Inoue et al. | 219/137.9 |
| 2005/0218132 A1 * | 10/2005 | Wells | 219/137.61 |
| 2006/0000817 A1 * | 1/2006 | Inoue et al. | 219/125.1 |
| 2007/0164008 A1 * | 7/2007 | Koshiishi et al. | 219/137.2 |
| 2008/0056859 A1 * | 3/2008 | Inoue et al. | 414/222.01 |
| 2008/0204072 A1 * | 8/2008 | Sasao et al. | 326/38 |
| 2008/0236324 A1 * | 10/2008 | Inoue et al. | 74/490.02 |
| 2008/0257868 A1 * | 10/2008 | Sassatelli et al. | 219/76.14 |
| 2008/0314876 A1 * | 12/2008 | Pinsonneault et al. | 219/74 |
| 2010/0032420 A1 * | 2/2010 | Inoue et al. | 219/136 |
| 2010/0108656 A1 * | 5/2010 | Natta | 219/137.63 |
| 2010/0276407 A1 * | 11/2010 | Cooper | 219/137.31 |
| 2011/0024394 A1 * | 2/2011 | Esslinger | 219/76.1 |
| 2012/0125904 A1 * | 5/2012 | Lee et al. | 219/137.61 |

OTHER PUBLICATIONS

Communication pursuant to Article 94(3) EPC for European Patent Application No. 13703938.4, dated Jul. 4, 2018, 5 pages.

* cited by examiner (2) PRIOR ART    OEM TREGASKISS LINER

OEM BERNARD LINER    (2) PRIOR ART (1)    TREGASKISS STYLE LINER

BERNARD STYLE LINER    (1)

(2) PRIOR ART    OEM TWECO LINER

OEM MILLER LINER    (2) PRIOR ART (1)    TWECO STYLE LINER

MILLER STYLE LINER    (1)

UNIVERSAL CONDUIT LINER FOR A WELDING TORCH

CROSS-REFERENCE TO RELATED APPLICATIONS

This application claims the benefit of provisional application Ser. No. 61/588,592, filed on Jan. 19, 2012. The disclosure of the above application is incorporated herein by reference.

FIELD

The disclosure relates generally to arc welding torch systems and components used in arc welding torches. More specifically, the disclosure relates to a universal conduit assembly applicable to gas metal arc welding (GMAW) or metal inert gas (MIG) welding systems.

BACKGROUND

The statements in this section merely provide background information related to the present disclosure and may not constitute prior art.

Gas metal arc welding (GMAW) or metal inert gas (MIG) welding utilize a metal wire to act as the electrode to produce an arc. The wire, which is shielded by an inert gas, acts a filler or raw material that forms the weld. Typically, the wire and gas are fed through a welding gun positioned proximate to the desired location for the weld. The wire is fed to the gun through a conduit coupled to both a powered wire feeder and a gas flow regulation system.

Traditionally, conduits consist of a coiled steel liner used to guide the welding wire and a brass connector that is crimped over the end of the conduit. The connector is designed to reversibly couple with the rear power plug of a torch or welding gun. The specific design of the connector is dependent upon the manufacturer of the welding gun because different manufacturers will differentiate their gun design from competitive products by using different plug geometries.

The different plug geometries utilized on different welding gun designs requires equipment distributors to stock a variety of conduits each having different end connectors in order to accommodate the various gun designs. For small distributors, the necessity of carrying a full line of conduits for each different welding gun is not economically feasible. In addition, end users of welding guns may use guns made by different manufacturers and are then limited to selecting a large distributor that can stock a full line of conduits for each welding gun or to use multiple distributors to service their equipment. In either case, the end-user is required to purchase and stock multiple conduit lines to service the various welding guns that they own.

DRAWINGS

The drawings described herein are for illustration purposes only and are not intended to limit the scope of the present disclosure in any way.

Figure 7A:
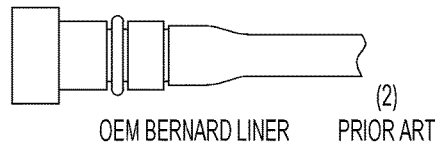
FIG. 7A is a perspective view comparing the geometric similarity between (1) a universal conduit assembly prepared according to the teachings of the present disclosure and (2) a conventional conduit connector from a first manufacturer.
Figure 7A:
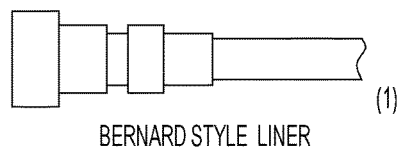
Figure 7A:
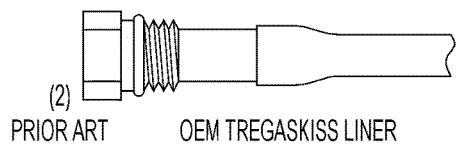
Figure 7B:
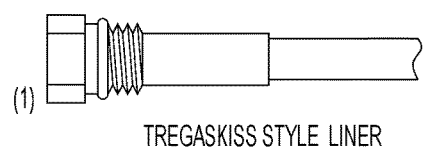
FIG. 7B is a perspective view comparing the geometric similarity between (1) a universal conduit assembly prepared according to the teachings of the present disclosure and (2) a conventional conduit connector from a second manufacturer.
Figure 7C:
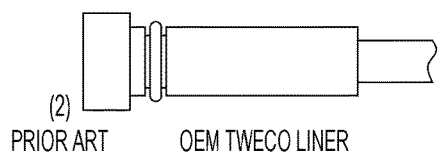
Figure 7C:
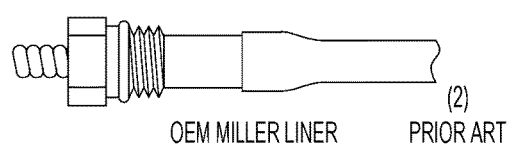
Figure 7C:
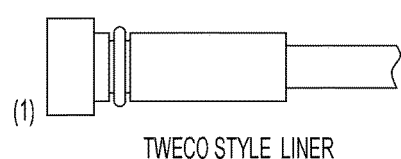
Figure 7D:
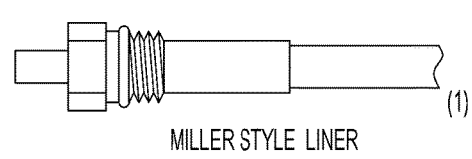

FIG. 7C is a perspective view comparing the geometric similarity between (1) a universal conduit assembly prepared according to the teachings of the present disclosure and (2) a conventional conduit connector from a third manufacturer; and FIG. 7D is a perspective view comparing the geometric similarity between (1) a universal conduit assembly prepared according to the teachings of the present disclosure and (2) a conventional conduit connector from a fourth manufacturer.

DETAILED DESCRIPTION

The following description is merely exemplary in nature and is in no way intended to limit the present disclosure or its application or uses. It should be understood that throughout the description and drawings, corresponding reference numerals indicate like or corresponding parts and features. As used throughout the description and claims, the term "proximal" refers to a position that is located towards the torch or gun handle, while the term "distal" refers to a position that is located towards the electrical power supply.

Figure 1:
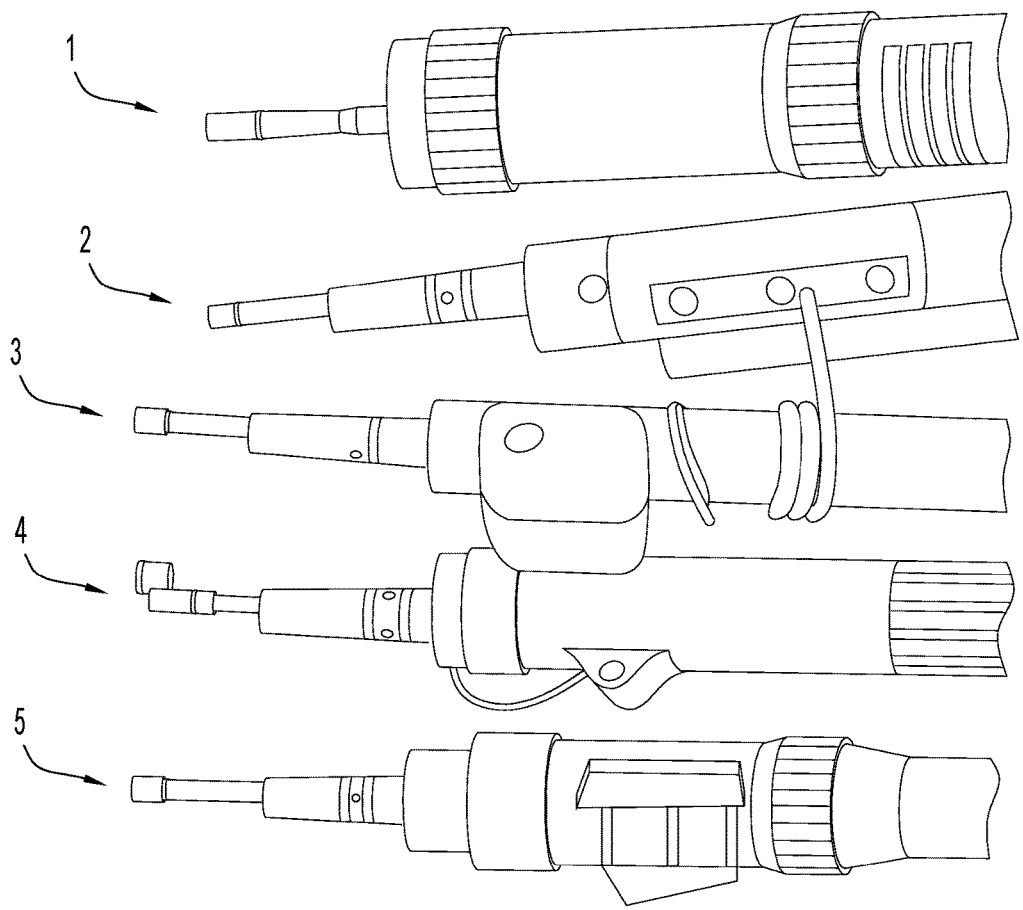
FIG. 1 is a perspective view of conventional conduit connector geometries used by five welding gun manufacturers.

The present disclosure generally provides a universal conduit assembly for a welding torch comprising a conduit liner defining a proximal end portion and a distal end portion; a conduit tip secured to the proximal end portion of the conduit liner; and an interchangeable conduit stop reversibly secured to the conduit tip. The interchangeable conduit stop is adapted for connection to a specific OEM (Original Equipment Manufacturer) power connector. For example, interchangeable conduit stops of the present disclosure are designed to resemble the conventional connector geometries used by different manufacturers, for example, as shown in FIG. 1.

Figure 2A:
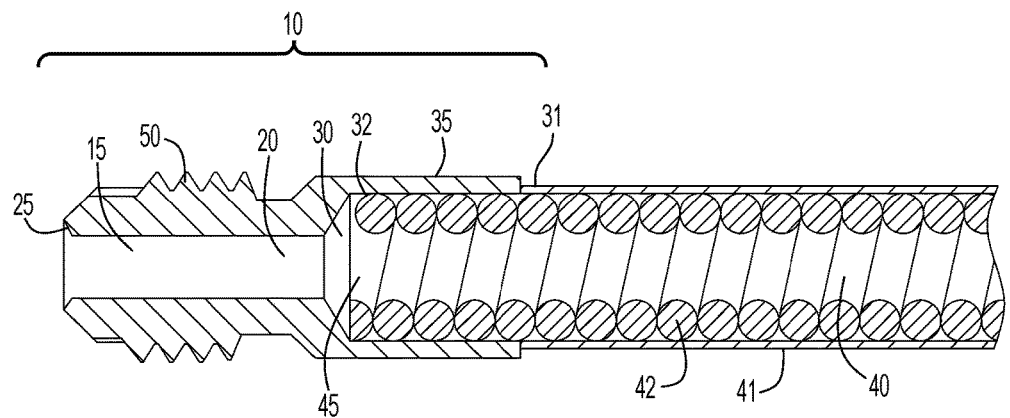
FIG. 2A is a cross-sectional view of a conduit tip and conduit liner prepared according to the teachings of the present disclosure.

Referring to FIG. 2A, the conduit tip 10 defines a central bore 15 extending from a proximal end portion 25 to a distal end portion 20, and a chamfer 30 disposed around the central bore 15 at the distal end portion 20. The conduit tip 10 defines an internal shoulder 35 having a first end 31 and a second end 32. The internal shoulder 35 is open at the first end 31, while the second end 32 engages the chamfer 30.

A conduit liner 40 having a proximal end portion 45 and a distal end portion engages the internal shoulder 35 where the proximal end portion 45 of the conduit liner 40 abuts the second end 32 of the internal shoulder 35 and the chamfer 30. The presence of the chamfer 30 provides protection for the conduit liner 40 against the presence of any sharp edges existing at the distal end portion 20 of the conduit tip 10. The conduit tip 10 is sized in order for the internal shoulder 35 to accommodate the outer diameter of the conduit liner 40. The conduit liner 40 can be any type of conduit known to one skilled in the art of welding. The conduit liner 40 may include a polymer material 41, such as a shrink tubing material, disposed about a metal coiled conduit 42. The conduit tip 10 can be secured to the conduit liner 40 by any method known to one skilled in the art, including but not limited to crimping, press-fitting, and adhesive bonding.

Figure 2B:
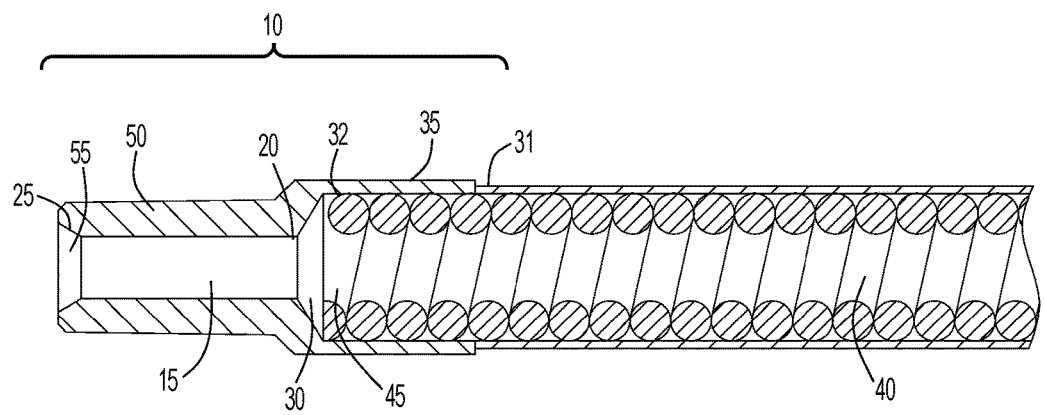
FIG. 2B is a cross-sectional view of a conduit tip and conduit liner according to another aspect of the present disclosure.

The conduit tip 10 further defines an external attachment area 50, which may be threaded as shown in FIG. 2A. A conduit tip 10 according to another aspect of the present disclosure is shown in FIG. 2B, where the external attachment area 50 is tapered, instead of being threaded. The angle of the taper is preferably about 1.5 degrees although one skilled-in-the-art will recognize that other taper angles may be used. Referring to FIG. 2B, the proximal end portion 25 of the conduit tip 10 may also include a chamfer 55 that encompasses the central bore 15. The purpose of the external attachment area 50 is to allow the conduit tip 10 to engage and become reversibly secured to a conduit stop. The means of attachment of the conduit tip 10 to a conduit stop is preferably one selected from the group of the meshing of threads, a taper lock, and a set screw. Preferably, the means of attachment is through the use of threads or a set screw because the use of a taper connection sometimes makes the disassembly of the parts more difficult due to the strength of the interaction between the conduit tip 15 and conduit stop. The body of the conduit stop defines an internally threaded portion for engagement with the externally threaded portion of the conduit tip. In order to reduce the occurrence of burrs when a threaded external attachment area 50 is used, the threads may comprise about a 30 degree angle at the start and the end of the threads.

Figure 3A:
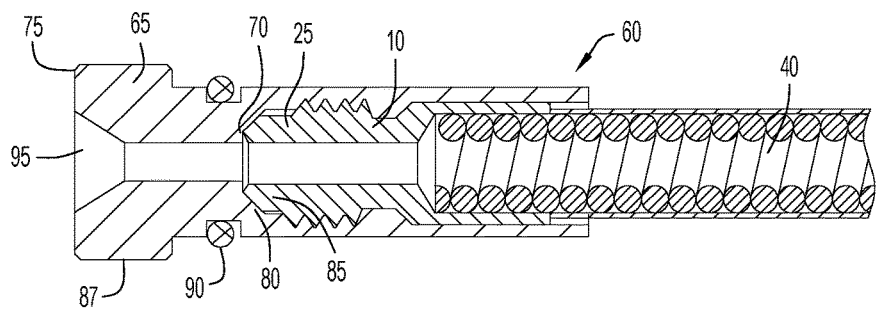
FIG. 3A is a cross-sectional view of a universal conduit assembly according to the teachings of the present disclosure showing a conduit stop coupled with the conduit tip and liner of FIG. 2A.
Figure 3B:
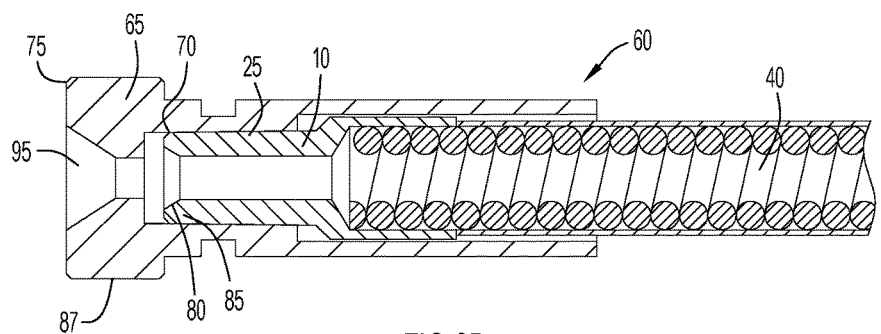
FIG. 3B is a cross-sectional view of another universal conduit assembly according to another aspect of the present disclosure showing a conduit stop coupled with the conduit tip and liner of FIG. 2B.
Figure 3C:
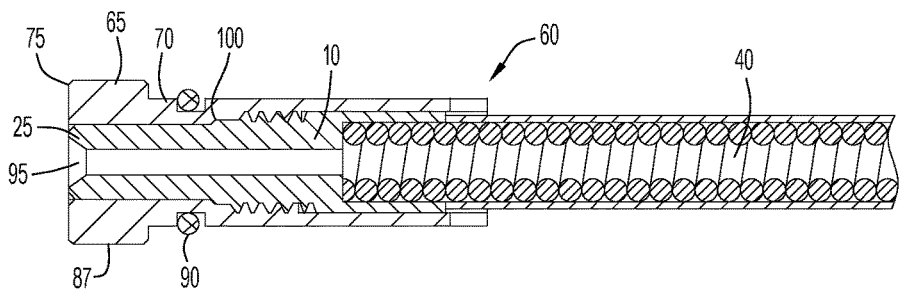
FIG. 3C is a cross-sectional view of a universal conduit assembly according to another aspect of the present disclosure showing a conduit stop coupled with the conduit tip and liner of FIG. 2C.

Referring now to FIGS. 3A and 3B, a universal conduit assembly 60 made according to the teachings of the present disclosure is shown. The universal conduit assembly 60 comprises a conduit stop 65, as well as the conduit tip 10 and conduit liner 40 as previously described with respect to FIGS. 2A and 2B. The conduit stop 65 and the conduit tip 10 engage one anther via the attachment area of the conduit tip 10. Preferably, the proximal end portion 25 of the conduit tip 10 extends to and engages the proximal end portion 70 of the conduit stop 65. One skilled-in-the-art will recognize that the distal end portion 25 of the conduit tip 10 may extend past or beyond the proximal end portion 70 of the conduit stop 65 as shown in FIG. 3C, where the distal end portion 25 of the conduit tip 15 extends to the distal end portion 75 of the conduit stop 65.

Referring again to FIGS. 3A and 3B, the conduit stop 65 defines an internal shoulder 80 and the conduit tip 10 defines an external shoulder 85 such that the external shoulder 85 of the conduit tip 10 abuts the internal shoulder 80 of the conduit stop 65 to provide a metal-to-metal gas seal. The internal shoulder 80 may also provide for the proper positioning of the conduit tip 15 in order for engagement with the conduit stop 65 through its attachment area 50. Referring now to FIG. 3C, the metal-to-metal gas seal may also be established by an angled shoulder 100 made by an indentation established in the body of the conduit stop 65 and a corresponding abutment established in the body of the conduit tip 15. The angle of the angled shoulder 100 is preferably about 118 degrees, although one skilled-in-the-art will recognize that other angles could be used.

Figure 4:
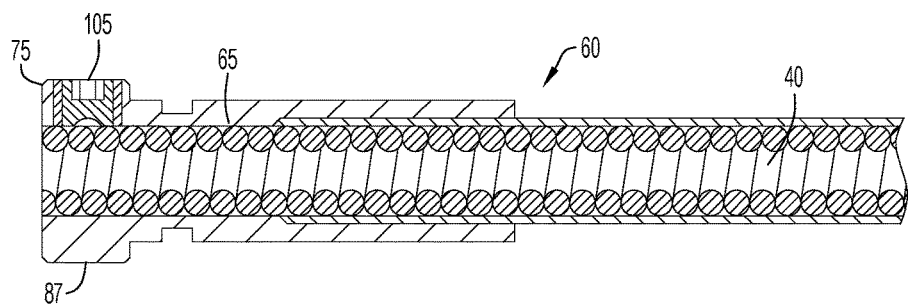
FIG. 4 is a cross-sectional view of a universal conduit assembly according to yet another aspect of the present disclosure.

Referring now to FIG. 4, a universal conduit assembly 60 prepared according to another aspect of the present disclosure is presented. In this case, the conduit liner 40 extends all the way to the distal end portion 75 of the conduit stop 65. A set screw 105 is used to secure the conduit stop 65 to the conduit liner 40. In this case, the presence of a conduit tip 15 is not necessary.

The external shape of the conduit stop 65 is designed to substantially resemble a specific OEM power connector for use with a corresponding welding torch system. The conduit stop 65 comprises an external surface 87 that may engage the specific OEM power connector. The specific OEM power connector is preferably selected from the group consisting of BERNARD™, MILLER®, TREGASKISS™, and TWECO® connectors. When desired or necessitated by the OEM power connector design, the universal conduit assembly 60 may include a sealing element 90 disposed around an external surface 87 of the conduit stop 65. The conduit stop 65 may also optionally comprise a chamfer 95 at its distal end 75 in order to protect the welding wire from any sharp edges.

The conduit liner 40 may comprise a polymer material 41 disposed around a metal coil or braided conduit 42. The metal coil conduit 42 may be comprised of a metal, such as, for example, aluminum, steel, copper, or a metal alloy, such as, for example, brass. The polymer material 41 may include, but not be limited to, any polymer that can provide electrical insulation and exhibit high thermal stability. Such a polymer material 41 is preferably available as a form of shrink wrap tubing. Similarly, the conduit tip 15 and conduit stop 65 may be formed from a metal that exhibits good electrical conductivity. Examples of such metals include aluminum, brass, and copper.

The conduit tip 15, conduit liner 40, and conduit stop 65 are each sized to accommodate the diameter size of the desired welding wire electrode selected for use. A different conduit tip 15, conduit liner 40, and conduit stop 65 may be required for each different wire size that may be used.

Figure 5:
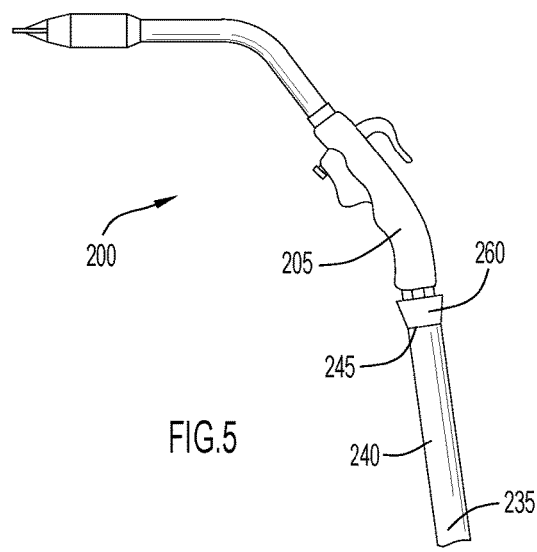
FIG. 5A is a perspective view comparing the geometric similarity between (1) a conventional conduit connector from a first manufacturer and (2) a universal conduit assembly prepared according to the teachings of the present disclosure.
FIG. 5B is a perspective view comparing the geometric similarity between (1) a conventional conduit connector from a second manufacturer and (2) a universal conduit assembly prepared according to the teachings of the present disclosure.
FIG. 5C is a perspective view comparing the geometric similarity between (1) a conventional conduit connector from a third manufacturer and (2) a universal conduit assembly prepared according to the teachings of the present disclosure.
FIG. 5D is a perspective view comparing the geometric similarity between (1) a conventional conduit connector from a fourth manufacturer and (2) a universal conduit assembly prepared according to the teachings of the present disclosure.

Referring now to FIG. 5, it is another objective of the present disclosure to provide a welding torch assembly 200 that comprises a welding gun handle 205; a welding cable 240 defining a proximal end portion 245 and a distal end portion 235, the welding cable 240 secured to the welding gun handle 205 at the proximal end portion 245; and a conduit assembly 260 disposed at the proximal end portion 245 of the welding cable 240. The conduit assembly 260 used for this welding torch assembly 200 is the universal conduit assembly 60 made by the teachings of the present disclosure. In such this conduit assembly 60 comprises a conduit liner 40 defining a proximal end portion 45 and a distal end portion; a conduit tip 15 secured to the proximal end portion 45 of the conduit liner 40; and an interchangeable conduit stop 65 removably secured to the conduit tip 15 with the interchangeable conduit stop 65 adapted for connection to a specific OEM power connector. The OEM power connector is typically part of the welding gun handle 205.

Figure 6:
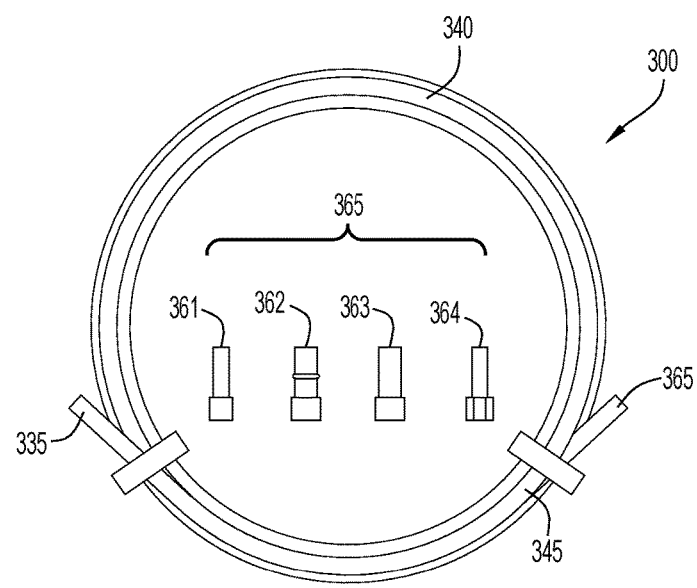
FIG. 6 is a perspective view of a welding conduit kit prepared according to the teachings of the present disclosure.

Referring now to FIG. 6, it is yet another objective of the present disclosure to provide a welding conduit kit 300 that comprises a conduit liner 340 defining a proximal end portion 345 and a distal end portion 335; a conduit tip 315 secured to the proximal end portion 345 of the conduit liner 340; and a plurality of interchangeable conduit stops 365 adapted for being removably secured to the conduit tip 315, the interchangeable conduit stops 365 adapted for connection to specific OEM power connectors. The specific OEM power connector is preferably selected from the group consisting of TWECO® 361, BERNARD™ 362, MILLER® 363, and TREGASKISS™ 364.

The following specific examples are given to illustrate the invention and should not be construed to limit the scope of the invention.

EXAMPLE 1

Comparison Between Universal Conduit Assembly and Specific OEM Power Connector

Universal conduit assemblies 60 were prepared according to the teachings of the present disclosure to resemble the OEM power connectors manufactured by TREGASKISS™, BERNARD™, TWECO®, and MILLER®. These universal conduit assemblies 60 were connected to a corresponding welding torch and found to perform similarly to conventional OEM power connectors. A visual comparison between the universal adapter assemblies 60 and the corresponding OEM power connectors are provided in FIG. 7. More specifically, the universal adapter assemblies 60 of the present disclosure are labeled as trial #1. while the specific OEM power connector sold by TREGASKISS™ (FIG. 7A), BERNARD™ (FIG. 7B), TWECO ™ (FIG. 7C), and MILLER® (FIG. 7D) are labeled as trial #2.

FIG. 7A is a perspective view comparing the geometric similarity between (1) a universal conduit assembly prepared according to the teachings of the present disclosure and (2) a conventional conduit connector manufactured by Tregaskiss™. FIG. 7B is a perspective view comparing the geometric similarity between (1) a universal conduit assembly prepared according to the teachings of the present disclosure and (2) a conventional conduit connector manufactured by Bernard™. FIG. 7C is a perspective view comparing the geometric similarity between (1) a universal conduit assembly prepared according to the teachings of the present disclosure and (2) a conventional conduit connector manufactured by Tweco®. FIG. 7D is a perspective view comparing the geometric similarity between (1) a universal conduit assembly prepared according to the teachings of the present disclosure and (2) a conventional conduit connector manufactured by Miller®. It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent. Further description of the present disclosure is provided in the notebook pages provided as Attachment A and incorporated herein, in its entirety, by reference.

What is claimed is:

1. A universal conduit assembly for a welding torch comprising:
   a conduit liner defining a proximal end portion and a distal end portion;
   a conduit tip secured to the proximal end portion of the conduit liner; and
   an interchangeable conduit stop removably secured to the conduit tip, the interchangeable conduit stop adapted for connection to a specific OEM power connector, wherein the interchangeable conduit stop extends beyond a distal end of the conduit tip to partially cover an electrical insulator surrounding and positioned directly adjacent to the conduit liner.

2. The universal conduit assembly according to claim 1, wherein the conduit tip defines a central bore extending from a proximal end portion to a distal end portion, and a chamfer disposed around the central bore at the distal end portion.

3. The universal conduit assembly according to claim 1, wherein a proximal end portion of the conduit tip extends to the distal end portion of the conduit stop, to the proximal end portion of the conduit stop, or beyond the proximal end portion of the conduit stop.

4. The universal conduit assembly according to claim 1, wherein the conduit tip defines an internal shoulder, and the proximal end portion of the conduit liner abuts the internal shoulder of the conduit tip.

5. The universal conduit assembly according to claim 1, wherein the conduit tip defines an external attachment area, and the interchangeable conduit stop is removably secured to the external attachment area of the conduit tip.

6. The universal conduit assembly according to claim 5, wherein the external attachment area is selected from the group consisting of threads, taper lock, and a set screw.

7. The universal conduit assembly according to claim 6, wherein the interchangeable conduit stop defines an internally threaded portion for engagement with the externally threaded portion of the conduit tip.

8. The universal conduit assembly according to claim 1, wherein the conduit stop comprises an external surface for engagement of the specific OEM power connector.

9. The universal conduit assembly according to claim 1 further comprising a sealing element disposed around an external portion of the conduit stop.

10. The universal conduit assembly according to claim 1, wherein the conduit tip is secured to the conduit liner by one selected from the group of crimping, press-fitting, and adhesive bonding.

11. The universal conduit assembly according to claim 1, wherein the conduit stop defines an internal shoulder and the conduit tip defines an external shoulder such that the external shoulder of the conduit tip abuts the internal shoulder of the conduit stop.

12. A welding torch comprising:
   a welding gun handle;
   a welding cable defining a proximal end portion and a distal end portion, the welding cable secured to the welding gun handle at the distal end portion;
   a universal conduit assembly disposed at the proximal end portion of the welding cable, the universal conduit assembly comprising:
      a conduit liner included as part of the welding cable and further defining the proximal end portion and distal end portion;
      a conduit tip secured to the proximal end portion of the conduit liner; and
      an interchangeable conduit stop removably secured to the conduit tip, the interchangeable conduit stop adapted for connection to a specific OEM power connector, wherein the interchangeable conduit stop extends beyond a distal end of the conduit tip to partially cover an electrical insulator surrounding and positioned directly adjacent to the conduit liner.

13. The welding torch according to claim 12, wherein a proximal end portion of the conduit tip extends to a distal end portion of the conduit stop.

14. The welding torch according to claim 12, wherein the conduit tip defines an external attachment area, and the interchangeable conduit stop is secured to the external attachment area of the conduit tip.

15. The welding torch according to claim 12, wherein the external attachment area is selected from the group consisting of threads, taper lock, and a set screw.

16. The welding torch according to claim 15, wherein the interchangeable conduit stop defines an internally threaded portion for engagement with the externally threaded portion of the conduit tip.

17. The welding torch according to claim 12, wherein the conduit stop defines an internal shoulder and the conduit tip defines an external shoulder such that the external shoulder of the conduit tip abuts the internal shoulder of the conduit stop to provide a gas seal.

18. A welding conduit kit comprising:
   a conduit liner defining a proximal end portion and a distal end portion;
   a conduit tip secured to the proximal end portion of the conduit liner; and
   a plurality of interchangeable conduit stops adapted for being removably secured to the conduit tip, the interchangeable conduit stops adapted for connection to specific OEM power connectors, wherein the interchangeable conduit stops extend beyond a distal end of the conduit tip to partially cover an electrical insulator surrounding and positioned directly adjacent to the conduit liner.

19. The welding conduit kit according to claim 18, wherein the conduit tip defines an external attachment area, and the interchangeable conduit stops are secured to the external attachment area of the conduit tip.

20. The welding conduit kit according to claim 19, wherein the external attachment area is selected from the group consisting of threads, taper lock, and a set screw.

21. The welding conduit kit according to claim 20, wherein the interchangeable conduit stop defines an internally threaded portion for engagement with the externally threaded portion of the conduit tip.

22. A universal conduit assembly for a welding torch comprising:
   a conduit liner defining a proximal end portion and a distal end portion;
   a conduit tip secured around the proximal end portion of the conduit liner, the conduit tip defining an externally threaded portion, a central bore extending from a proximal end portion to a distal end portion, and a chamfer disposed around the central bore at the distal end portion; and
   an interchangeable conduit stop defining an internally threaded portion for engagement with the externally threaded portion of the conduit tip, the interchangeable conduit stop adapted for connection to a specific OEM power connector, wherein the interchangeable conduit stop extends beyond a distal end of the conduit tip to partially cover an electrical insulator surrounding and positioned directly adjacent to the conduit liner, and
   wherein the proximal end portion of the conduit tip extends to a distal end portion of the conduit stop, and the conduit stop defines an internal shoulder and the conduit tip defines an external shoulder such that the external shoulder of the conduit tip abuts the internal shoulder of the conduit stop to provide a gas seal.

23. A conduit tip for use with a conduit liner of a welding torch, the conduit tip comprising:
   a body defining a proximal end portion and a distal end portion;
   an external attachment area for securing a variety of conduit stops;
   an internal recess for receiving a conduit liner;
   a central bore extending from the proximal end portion to the distal end portion;
   a chamfer disposed around the central bore at the proximal end portion; and
   an external shoulder adapted for engaging an internal shoulder of one of the variety of conduit stops to provide a gas seal, the one of the variety of conduit stops extending beyond a distal end of the conduit tip to partially cover an electrical insulator surrounding and positioned directly adjacent to the conduit liner.

24. The conduit tip according to claim 23, wherein the external attachment area is selected from the group consisting of threads, taper lock, and a set screw.

* * * * *